United States Patent
Witzel et al.

(10) Patent No.: US 9,614,876 B2
(45) Date of Patent: Apr. 4, 2017

(54) PROVISION OF IMS SERVICES VIA CIRCUIT-SWITCHED ACCESS

(75) Inventors: Andreas Witzel, Herzogenrath (DE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2206 days.

(21) Appl. No.: 12/090,993

(22) PCT Filed: Oct. 21, 2005

(86) PCT No.: PCT/EP2005/011338
§ 371 (c)(1),
(2), (4) Date: Apr. 21, 2008

(87) PCT Pub. No.: WO2007/045264
PCT Pub. Date: Apr. 26, 2007

(65) Prior Publication Data
US 2008/0247385 A1    Oct. 9, 2008

(51) Int. Cl.
*H04L 29/06* (2006.01)
*H04W 88/16* (2009.01)
*H04W 92/02* (2009.01)

(52) U.S. Cl.
CPC ........ *H04L 65/104* (2013.01); *H04L 65/1036* (2013.01); *H04L 65/1016* (2013.01); *H04W 88/16* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 6,219,546 B1* | 4/2001 | Valentine et al. | 455/428 |
| 6,584,312 B1* | 6/2003 | Morin et al. | 455/433 |
| 6,622,016 B1* | 9/2003 | Sladek et al. | 455/414.1 |
| 6,996,087 B2* | 2/2006 | Ejzak | 370/338 |
| 7,330,542 B2* | 2/2008 | Kauhanen et al. | 379/229 |
| 7,894,593 B2* | 2/2011 | Garcia-Martin et al. | 379/221.01 |
| 2001/0018348 A1* | 8/2001 | Joshi et al. | 455/450 |
| 2002/0110104 A1* | 8/2002 | Surdila et al. | 370/338 |
| 2003/0027569 A1 | 2/2003 | Ejzak | |
| 2003/0129962 A1* | 7/2003 | Chaney | 455/406 |
| 2005/0083909 A1* | 4/2005 | Kuusinen et al. | 370/352 |
| 2006/0142011 A1* | 6/2006 | Kallio | 455/445 |
| 2006/0176876 A1* | 8/2006 | Aborn et al. | 370/352 |
| 2006/0268835 A1* | 11/2006 | Hyotylainen et al. | 370/352 |
| 2007/0032251 A1* | 2/2007 | Shaheen | 455/466 |

* cited by examiner

*Primary Examiner* — Chirag Shah
*Assistant Examiner* — Srinivasa Reddivalam (57) ABSTRACT

The present invention proposes a solution for providing IMS services to users having circuit-switched controlled terminal being not adapted to provide IMS services to the users. In particular, it is proposed, in order to allow IMS to take the full call and service control, to place a user agent being responsible for the user ported to the IMS in a new node type called Mobile Access Gateway Control Function (MAGCF). This new node combines the logical functionality of a cellular switching center and the logical functionality of IMS. Further it is proposed to enhance a user's register, like HLR, to provide also information about the availability of a MAGCF node and about whether a particular user is enabled to use the MAGCF functionality.

16 Claims, 8 Drawing Sheets

PROVISION OF IMS SERVICES VIA CIRCUIT-SWITCHED ACCESS

TECHNICAL FIELD OF THE INVENTION

The present invention relates to providing IMS service to a user having circuited-switched controlled user's equipment.

BACKGROUND

Third Generation (3G) Networks such as UMTS (Universal Telecommunication Network) and CDMA 2000 provide high-speed wireless Internet access to mobile users over a wide coverage area. For the 3G networks the IP Multimedia Subsystem IMS has been defined to provide cellular access to the services of the Internet in order to support telephony and multimedia services. The IMS uses packet-switched technology, in particular IP-network and other IETF protocols for provision of services. The 2nd Generation networks, like GSM, provide voice based on a circuit-switched technology. The strength of IMS is the provision of enhanced Services, for example multimedia services combining voice and data. Further, the usage of IP-network as a single underlying standard allows an easy and fast service deployment.

A Session Initiation Protocol SIP has been chosen in IMS for signalling between the user's equipment UE and the IMS as well as between the components within the IMS. The IMS uses SIP also to complete voice and multimedia calls in the Internet. In order to be able to use the IMS service, the communicating user's equipment has to support IMS, which means SIP has to be implemented in the user's equipment.

In the following simplified network architectures of IMS is described. In particular the nodes being involved in provision of service in IMS architecture are mentioned.

The components of the IMS system are the Call Session Control Function (CSCF), the Media Gateway (MGW)/Media Gateway Control Function (MGCF), the Home Subscriber Register (HSR), the Application Server (AS), and the Transport Signalling Gateway (T-SGW).

The CSCF acts as a call server and handles call signalling, it supports and controls the multimedia sessions and performs address translation functions. The CSCF can be functionally decomposed to S-CSCF, I-CSCF and P-CSCF. The Proxy-CSCF (P-CSCF) is the first contact point in a visited IMS network and it provides authorization of bearer resources, further it forwards a SIP register request received from the User Equipment UE to an I-CSCF determined using the home domain name, as provided by the UE. In the opposite direction it forwards the SIP request or response to the UE. Moreover the CSCF forwards SIP messages received from the UE to a SIP server (S-CSCF) whose name the P-CSCF has received as a result of the registration procedure.

The Interrogating-CSCF (I-CSCF) is the contact point within an operator's network for all connections destined to a subscriber of that network operator, or a roaming user currently located within that network operator's service area. There may be multiple I-CSCFs within an operator's network. The main function performed by the I-CSCF is assigning a S-CSCF to a user performing SIP registration. The Serving Call Session Control Function (S-CSCF) is the node that performs the session management for the IMS network. There can be several S-CSCFs in the network. The main functions of S-CSCF include: acceptation of registration requests from UE, interacting with services platforms for the support of services. Further it provides endpoints with service event related information (like for example notification of tones/announcement together with location of additional media resources, billing notification).

The Home Subscriber Register HSR is the centralized subscriber database. The HSR interfaces with the I-CSCF and the S-CSCF to provide information about the location of the subscriber and the subscriber's subscription information. The HSR is responsible for holding the following user related information: user identification, numbering and addressing information, user security information for authentication and authorization. The HSR supports the user registration, and stores inter-system location information.

The IMS supports several nodes for inter-working with legacy networks. These are the Media Gateway Control Function (MGCF) and the Transport Signalling Gateway (TSGW).

The MGCF performs protocol conversion between cellular call control protocols and IMS protocols. For example, the MGCF receives a SIP message from the CSCF and converts it into appropriate ISUP messages and sends it to the Transport Signaling Gateway. Thus, the primary function of MGCF is to convert signalling information from one format to another in uplink and downlink direction. In UMTS this will predominantly be between Pulse Code Modulation (PCM) in the PSTN and an IP based format.

The T-SGW is the signaling end point in the case of interworking with PSTN/legacy networks. It maps call-related signaling protocols from/to PSTN on an IP bearer and sends it to/from the MGCF. The T-SGW converts the lower layers of SS7 into IP.

As already mentioned the UMTS system allows mobiles operating in packet mode to establish voice calls using SIP as the signalling protocol. The SIP messages are sent to communicate the request to the Call Session Control Function (CSCF) in the IMS. In this case, the data is transmitted as packets throughout the UMTS network. However in order to access any service in IMS the user has to perform a registration procedure in the IMS system. Said registration procedure is performed by means of an user agent being implemented in the user's equipment.

Thus, the IMS has been deployed for the 3G networks for provision of services using packet-switched technology with SIP as applied signalling protocol. However, currently the major numbers of user's equipment do not support IMS technology with SIP as signalling protocol for voice service, since said user's equipment is adapted for a circuit-switched controlled domain. Thus, for the access to the IMS an adaptation of the user's equipment is necessary.

SUMMARY AND DESCRIPTION OF THE INVENTION

Therefore, it is an object of the present invention to provide a solution for providing IMS services to user's equipment operating in circuit-switched controlled domain.

The invention is disclosed in the independent claims. Advantageous embodiments are described in the dependent claims being disclosed in the corresponding parts of the description.

According to the present invention it is proposed to provide an Access Gateway Node comprising a circuit-switched function, a user agent and an exchange interface. The circuit-switched function has all the functions being required to exchange signalling with the cellular-switched controlled network, in which a user is located. Further the circuit-switched function has the ability to exchange information with a register being located in the circuit-switched controlled domain. Preferably said register is a Home Location Register HLR, which provides IP multimedia system parameter to the Access Gateway Node. Said parameters are used according to the present invention for registration the user in the IMS system. In order to interact with the IMS the received data are provided over the exchange interface to the user agent.

In one embodiment it is proposed that the IP multimedia system parameter is an indication that a subscription of the circuit-switched controlled user's terminal has been ported to the IP multimedia system. In this case the Access Gateway Node is responsible to provide the IP multimedia system parameters which are required to register the circuit-switched controlled user's terminal in the IP multimedia system.

In a further embodiment it is proposed that the received IP multimedia system parameter, received from the register includes already a list of parameters required to register the circuit-switched controlled user's terminal in the IP multimedia system.

According to one of the embodiments of the present invention, the exchange interface is adapted to deliver the IP multimedia system parameter provided by the circuit-switched function to the user agent being responsible for the registration of the user in the IP multimedia system or for updating a current registration. However in order to exchange this kind of message between two different systems it is proposed to provide a translation mechanism between circuit-switched controlled signalling and IMS controlled signalling, in particular in view of the different signalling protocols and their required parameters.

Further it is proposed that the circuit-switched function is adapted to receive mobility related notification from a mobile switching node to which the circuit-switched controlled user's terminal is attached for handling the provision of an access to the IP multimedia system. Thus for example in a GSM network a signalling mechanism is available to inform that the user is still attached to the network, although the user does not perform any calls. According to the present invention it is proposed to provide this kind of information to the IP multimedia system in order to keep the user's registration alive.

Further it is proposed to provide a register located in a circuit-switched controlled domain and communicating with the circuited-switched function, which is located in the Access Gateway Node. Preferably said register is a Home Location Register as already known in GSM providing data of all users having subscription in a network, for which the HLR is responsible. Said register comprises a receiver entity adapted to receive a request message regarding handling a circuit-switched controlled user's terminal. The message might be for example an update message when a user changes the serving areas. In this case a corresponding update of user's data is to be performed in the register in order to be able to locate the user.

Further the register comprises a provision module adapted to provide information about the functionality of the circuit-switched function. According to the present invention the circuit-switched function either is enhanced with the user agent functionality, which means that the circuit-switched function is part of the Access Gateway Node or this kind of functionality is not supported, which means in case of GSM the circuit-switched function is for example the well known MSC. It is proposed to store this information in a place being accessible by the register. Another embodiment might be that an indication about supported functionality of the circuit switched function is included in a message sent from said circuit-switched function to the register. In this case the task of the provision module is to extract the information from the received message. Said message might be either a separate message or the required information might be included in any existing and suitable message, like for example in an update message.

Moreover it is proposed that the register comprises a user's parameter module adapted to provide user's IP multimedia system parameter applicable in the IP multimedia system in case the circuit-switched function is part of the Access Gateway Node.

Further it is proposed that the register comprises a sender entity for sending the user's IP multimedia system parameter to the wireless switching function.

Further it is proposed that the register further comprises a tracking module adapted to keep track on a serving Access Gateway Node and on a mobile switching node to which the circuit-switched controlled user's terminal is attached. This might be for example the case when a user is in a visited network, which does not have the Access Gateway Nodes. In this case the user is attached to a usual circuit-switched function, like for example MSC. However the IMS provision is performed by means of the Access Gateway Node located in the home network. Thus, it is proposed that the register keeps track on both nodes.

Further it is proposed that the register node further comprises a selection unit adapted to select a new serving Access Gateway Node in case the circuit-switched controlled user's terminal leaves a serving area of a present Access Gateway Node. The register might have for example a list with the available Access Gateway Nodes and according to the location of the user one is selected.

Further it is an advantage of the present invention that the register node comprises also a modification module adapted to modify the user's IP multimedia system parameter before sending it in case the circuit-switched controlled user's terminal is served by a mobile switching node. As above already mentioned when a user is to be handled by a well known MSC than it is proposed to send modified user's IP multimedia system parameter, which means that although the user is ported to IP multimedia system a usual circuit-switched service is to be provided to the user.

Thus, according to the present invention the complete IP multimedia parameter is sent only to an identified Access Gateway Node. Otherwise said parameters are to be modified since not all of the parameters are applicable for the circuit-switched function. For example it is proposed to remove services from the user's IP multimedia system parameter which are only handled in the IP multimedia system.

Further it is proposed to have a method which is to be carried out in the Access Gateway Node. Thus, it is proposed that a circuit-switched function receives from a circuit-switched controlled user's terminal a registration message, and upon receipt of this message an interaction with a register node for providing user's IP multimedia system parameter is performed. When a message including the user's IP multimedia system parameter from a server is received, said circuit-switched function provides the received user's IP multimedia system parameter to an user agent being also a part of the Access Gateway Node. The user agent uses the user's IP multimedia system parameter to register the circuit-switched controlled user's terminal in the IP multimedia system (IMS).

Further it is also proposed to have a method which is to be carried out in the register. In a first step the register receives a request message regarding a circuit-switched controlled user's terminal from the circuit-switched function for handling the circuit-switched controlled user's terminal. Further information is provided about a functionality of the circuit-switched function sending the request message. The functionality indicates whether the circuit-switched function is part of an Access Gateway. In such a case user's IP multimedia system parameter applicable in the IP multimedia system are provided to the circuit-switched function. Finally a message is sent to the circuit-switched function with the user's IP multimedia system parameter.

The advantage of the present invention is that it provides a smooth migration from a circuit-switched domain to a packet-switched domain. In particular for a user with a circuit-switched adapted equipment a solution is given to use IMS service.

Further advantageous embodiments are described in the dependent claims.

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which.

It should be noted that the term "entity", "node", "module", in the context of the present invention refers to any suitable combination of hardware and software for providing a predetermined functionality in the communication network. In this way, said terms generally refers to a logical entity that can be spread out over several physical entities, but can also refer to a physical entity located in one physical location, if no explicit definition is given.

It should be noted that the term "user" in the context of the present invention refers to circuit-switched controlled user equipment, wherein said user equipment is a combination of hardware and software. However in the following description the terms "user" and "user equipment" should be seen as having the same meaning, if it is not stated differently.

Preferably, the communication network is a mobile communication network, e.g. is a wireless communication network operating according to GSM, GPRS (General Packet Switched Radio) or UMTS (Universal Mobile Telephone System) or any 3G system like for example EDGE, CDMA2000.

Figure 1:
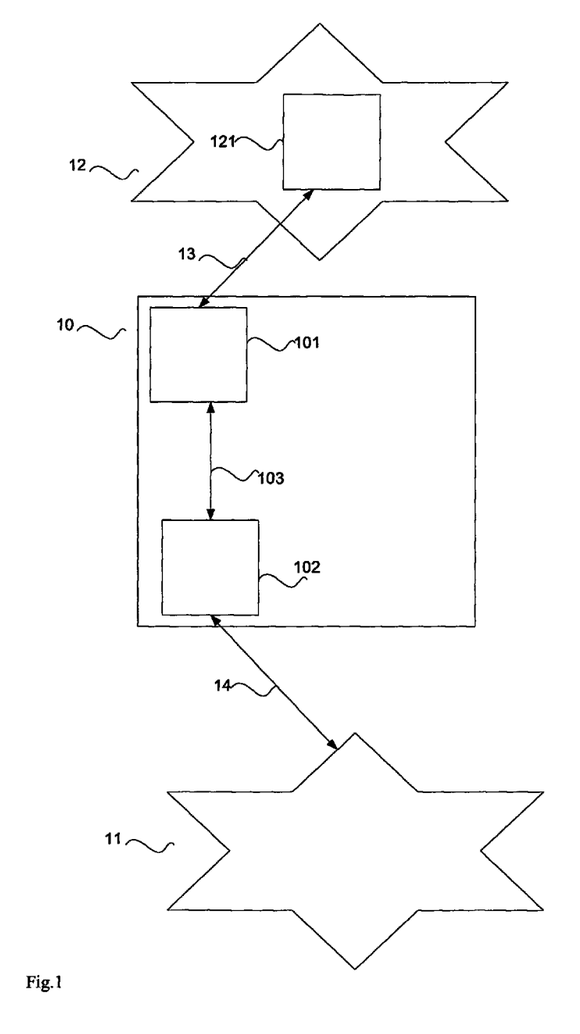
FIG. 1 shows a schematic representation of an architecture of Access Gateway Node according to the present invention.

In the following a preferably embodiment according to FIG. 1 is presented. FIG. 1 shows a schematic representation of an architecture of an Access Gateway Node, 10 according to the present invention. In particular in FIG. 1 the Access Gateway Node, 10 is depicted which communicates on one side with the IP multimedia system, which will be called in the following IMS, 11 and on the other hand with the cellular-switched controlled network, 12, like for example GSM. In the foregoing description a node called MAGCF Mobile Access Gateway Control Function represents an embodiment of the Access Gateway Node, 10. The Access Gateway Node comprises a circuit-switched function 101, a user agent 102 and an exchange interface 103.

It is to be noted that although the Access Gateway Mode, 10 is depicted in FIG. 1 between the network 11 and the network 12, this location should not be seen as any restriction for the present invention. The Access Gateway Node is to be located in any suitable place. According to one of the embodiments it is proposed to place said node in the circuit-switched domain, 12.

The circuit-switched function 101 is preferably a function fulfilling the functionality of MSC. Thus, it has all the functions being required to exchange signalling with the cellular-switched controlled network, 12 in which a user is located, wherein the communication with the user is performed over a radio interface, not depicted in FIG. 1. Said connection might be performed by means by any suitably signalling protocol, in case of GSM this might be the well-known Mobile Application Protocol MAP or ISUP or BICC. Thus, the task of the circuit-switched function 101 is to provide exchange signalling for a circuit-switched controlled user's terminal located in the circuit-switched controlled domain CS, as it is performed currently in GSM by means of MSC with all its functions. Further the circuit-switched function 101 has the ability to exchange information with a register 121 being located in the circuit-switched controlled domain, interface 13. Preferably said register is a Home Location Register HLR, which provides IP multimedia system parameter to the Access Gateway Node. Said parameters are used according to the present invention for registration the user in the IMS system. In order to interact with the IMS the received data are provided over the exchange interface 103 to the user agent 102. Preferably, a SIP agent might perform the task of the user agent 102. This includes for example the registration of the user or updating of the user's data in the IMS. The communication for this purpose is performed by means of the link 14 according to FIG. 1

Figure 2:
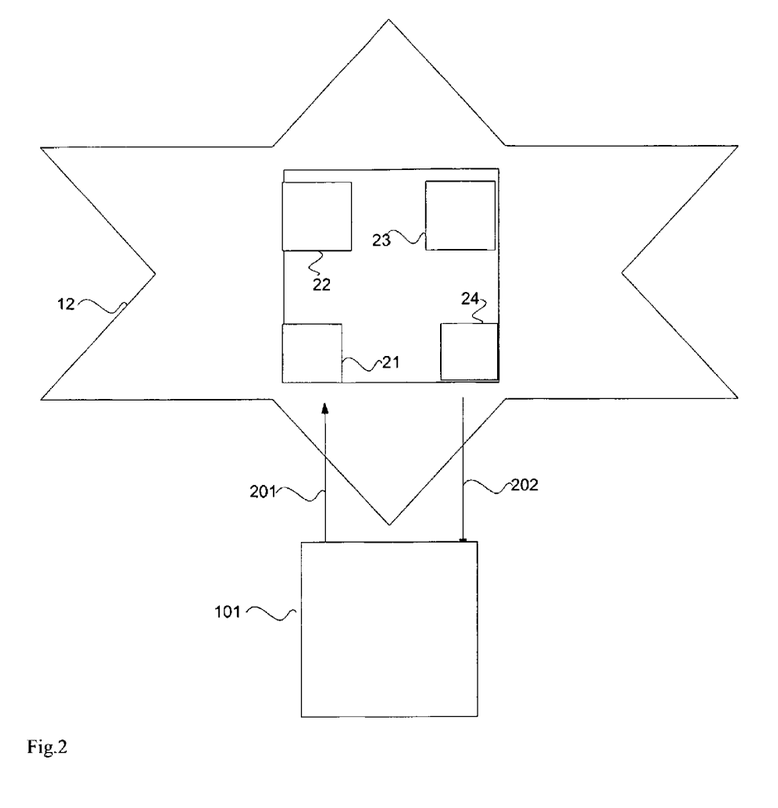
FIG. 2 shows a schematic representation of an architecture of the Access Gateway Node according to the present invention.

FIG. 2 represents an embodiment for the realisation of a register 121 located in a circuit-switched controlled domain, CS, 12 and communicating with the Access Gateway Node 10. Preferably said register is a Home Location Register as already known in GSM providing data of all users having subscription in a network, for which the HLR is responsible. According to the present invention it is proposed to extend the register in a way to be able to provide IP multimedia system parameter to the Access Gateway Node, besides its ability to communicate with a circuit-switched function 101, like for example in case of GSM with the MSC. According to FIG. 2 said register 121 comprises a receiver entity 21 adapted to receive a request message regarding handling a circuit-switched controlled user's terminal, 201. The messages might be for example an update message when a user changes the serving areas. In this case a corresponding update of user's data is to be performed in the register in order to be able to locate the user. In case of GSM a MAP:Location update message is sent from the MSC to the HLR. However, this is only one preferably embodiment for the implementation of the messages.

Further the register 121 comprises a provision module 22 adapted to provide information about the functionality of the circuit-switched function 101. According to the present invention the circuit-switched function either is enhanced with the user agent functionality, which means that the circuit-switched function is part of the Access Gateway Node or this kind of functionality is not supported, which means in case of GSM the circuit-switched function is the well known MSC. Thus, it is the task of the provision module to provide this kind of information. There might be different ways of suitable and preferable realisations. For example this kind of information might be stored in a place being accessible by the register and not in the register itself. This might be for example a list with all the circuit-switched functions and an indication whether said circuit-switched function is part of the Access Gateway Node. The task of the provision module is in this case to deliver the information from the list. Further embodiment might be that an indication about supported functionality of the circuit switched function is included in a message sent from said circuit-switched function to the register. In this case the task of the provision module is to extract the information from the received message. Said message might be either a separate message or the required information might be included in any existing and suitable message, like for example in an update message.

Moreover it is proposed that the register 121 comprises a user's parameter module 23 adapted to provide user's IP multimedia system parameter applicable in the IP multimedia system in case the circuit-switched function is part of the Access Gateway Node. Preferably the IP multimedia system parameters are to be stored together with other user's related data. However it might be also suitable to store only indication that the user is ported to the IP multimedia system. The user is ported to IP multimedia system, if the user has made an active decision to end a current circuit-switched contract with the corresponding service provider and has signed a new contract for using IP multimedia Services. Another option might be that the operator decides to port all of the subscribers to the IP multimedia Services providing still some subset of the old circuit-switched services.

Further parameters which might be required during different procedures might be delivered from the appropriate places, like for example an additional data base might be provided which is to be accessible by the user agent 103.

Further it is proposed that the register comprises a sender entity 24 for sending the user's IF multimedia system parameter to the wireless switching function over the interface 202.

Figure 3:
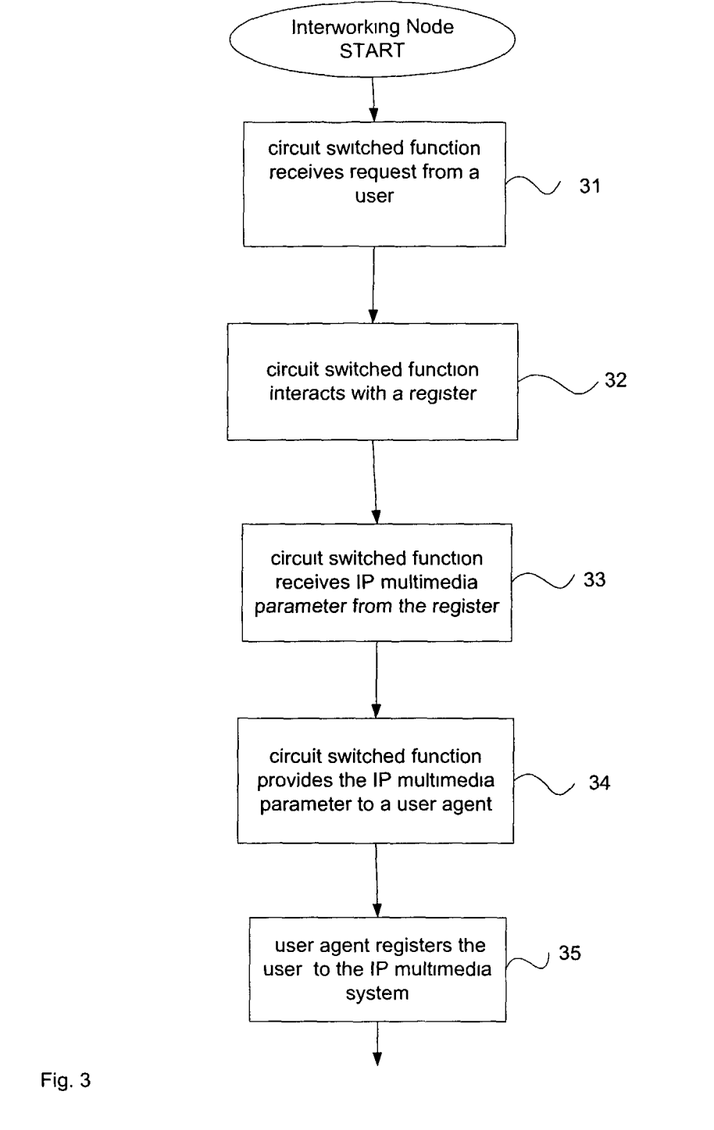
FIG. 3 shows a flowchart of an embodiment of the present invention for a method being to be performed on the Access Gateway Node.

In respect to FIG. 3 an embodiment of the present invention for a method to be performed on the Access Gateway Node is presented. In step 31 a circuit-switched function located in the Access Gateway Node receives from a circuit-switched controlled user's terminal a registration message. That implies that the user has a circuit-switched terminal without support for the IMS services. According to the well-known procedure the wireless switching function being, according to the present invention, part of the Access Gateway Node interacts with a register node for providing user's IP multimedia system parameter, 32. In the subsequent step, 33 the circuit-switched function receives the requested IP multimedia system parameters and provides them to a user agent located in the Access Gateway Node, 34. Upon receipt of said parameter the user agent initiates a procedure for registration the user in the IP multimedia system (IMS), 35.

In the following a basic concept of the present invention is described. According to the present invention it is proposed, in order to allow IMS to take the full call and service control, to place a user agent being responsible for the user in a new node type called MAGCF being an embodiment of the above mentioned Access Gateway Node. This new node combines therefore the logical functionality of a cellular switching center and the logical functionality of IMS. In particular it is proposed that the MAGCF comprises well-known functionality like for example a MSC-S being serving MSC for a roaming user, a GMSC-S for terminating calls to a roaming user in a network without MAGCF functionality, a MGCF performing protocol conversion between cellular call control protocols and IMS protocols, a P-CSCF forwarding SIP messages from the user to IMS and from IMS to the user, a User Agent fulfilling the IMS functionality and handling on behalf of the user.

The basic concept is that the MAGCF hosts the user agent of the subscriber and registers the subscriber having a cellular controlled access in IMS. Therefore, the MAGCF is the roaming anchor point for the cellular access towards IMS. In the following different embodiments for the realization of the anchor point are described. For example an embodiment is given describing changing of a service MSC-S while roaming in a home network. In this case the MAGCF roaming anchor point is moved to the new MSC-S. Further, when roaming into a visited network without support for MAGCF, the last responsible MAGCF is kept as anchor point. In all embodiments it is to be ensured that all originating and terminating calls of the subscriber are routed via the responsible MAGCF.

In general it might be said that the MAGCF interworks the circuit-switched protocols towards IMS protocols and vice versa.

Figure 4:
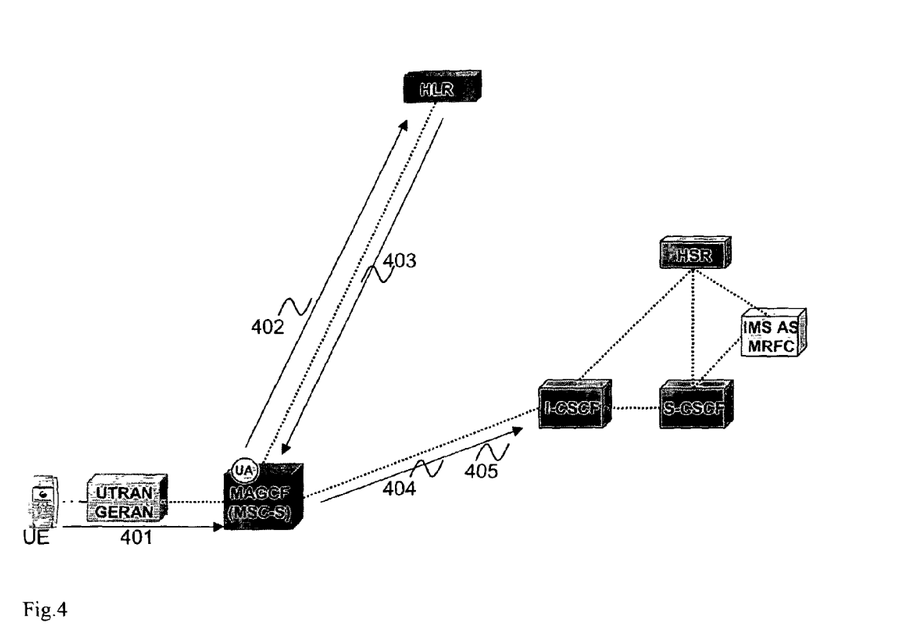
FIG. 4 shows a schematic embodiment for IMSI Attach in MAGCF and IMS registration.

In the following an embodiment of the present invention is described in respect to FIG. 4, presenting the user's registration procedure, including an attach procedure.

FIG. 4 depicts a cellular capable user equipment UE communicating with the MAGCF over a UTRAN/GERAN access network. The MAGCF node according to the present invention has functionality to communicate with the cellular-switched controlled system and with the IMS system. The IMS system comprises I-CSCF, S-CSCF and HSR nodes. According to the present invention said MAGCF node has the MSC functionality, like MSC-S and the IMS functionality in form of user agent UA. The MAGCF has therefore the capability to communicate with the HLR and with the IMS. Further there is also the IMS Access Server IMS AS for provision of IMS services communicating with HSR and S-CSCF. The sequence of the messages exchange is depicted by means of lines provided with arrows. The dotted lines are provided to show the signalling connections between the nodes.

In the following traffic case is described, when a user switches on the circuit-switched controlled user equipment UE in a home network. In the first step, 401 UE sends an IMSI attach message to the MAGCF in order to become reachable via the circuit-switched controlled access. Since this is a new subscriber being not registered in the MAGCF, the responsible HLR is contacted to inform about the location update, 402. Preferably the HLR has information that the received information is from a MSC being enhanced with the MAGCF functionality. In this case of a static list being administrated by the HLR, no changes on the interface between MSC and HLR has to be implemented, that means that a standard protocol for communication, like for example the MAP protocol might be used. However optionally in step 402, the MAGCF can indicate to the HLR that it has the MAGCF functionality, to differentiate itself from a MSC supporting only cellular-switched functionality. However, this would imply changes to the standard MAP protocol. On the basis of the provided information, either by checking the indication in the MAP Update Location message, or by checking a list with all MAGCF nodes, the HLR checks whether the sending node has MAGCF functionality. In the following step, the HLR checks the requesting subscriber. In order to provide the IMS functionality to the users, said users has to be ported to the IMS system. In other words, the user has to either announce actively the change to the IMS system or the system might decide to port cellular users to the IMS system. A corresponding notification about the user is to be stated in the HLR. In case a user is not ported, it is proposed to apply the standard behaviour for a cellular user like it is already known. In case the user is ported to the IMS, it is proposed that the HLR inserts the IMS related subscriber data into the MAGCF required to register said user to the IMS system, step 403. Preferably the HLR sends all the parameters, which are usually stored at the SIM card in the user's equipment. The MAGCF receives the message 403, wherein it is to be pointed out that the communication with the HLR is performed by the circuit-switched functionality of the MAGCF, in particular the MSC is involved therein. Upon receipt of the message from the HLR, the MAGCF checks at first whether the user supports the IMS, in case of supporting the MSC-F contacts the user agent in order to register and to subscribe the subscriber in the IMS system, steps 404 and 405. Preferably the applied protocol for the registration and for the subscription purpose is the SIP protocol, in this case also the user agent has SIP functionality implemented. During the IMS registration, the user agent acts on behalf of the subscriber. All steps necessary for registration like for example, the authorization of the users, are performed by the means of the IMS entities integrated in the MAGCF. The result of the registration is that the MAGCF stores the S-CSCF address and following the IMS rules for registration, the S-CSCF stores the MAGCF address where the registered subscriber can be reached. After successful registration, in step 405, the user agent in the MAGCF subscribes in the S-CSCF to the registration status of the served subscriber. So if the registration status of the subscriber is changed in the S-CSCF, the MAGCF is to be informed.

As a consequence of the procedure according to FIG. 4, the subscriber is attached in the MAGCF from the cellular controlled side and registered in the IMS. The same procedure is presented in more detail in the signaling sequence in respect to FIG. 5. The same nodes as in FIG. 4 are depicted.

Figure 5:
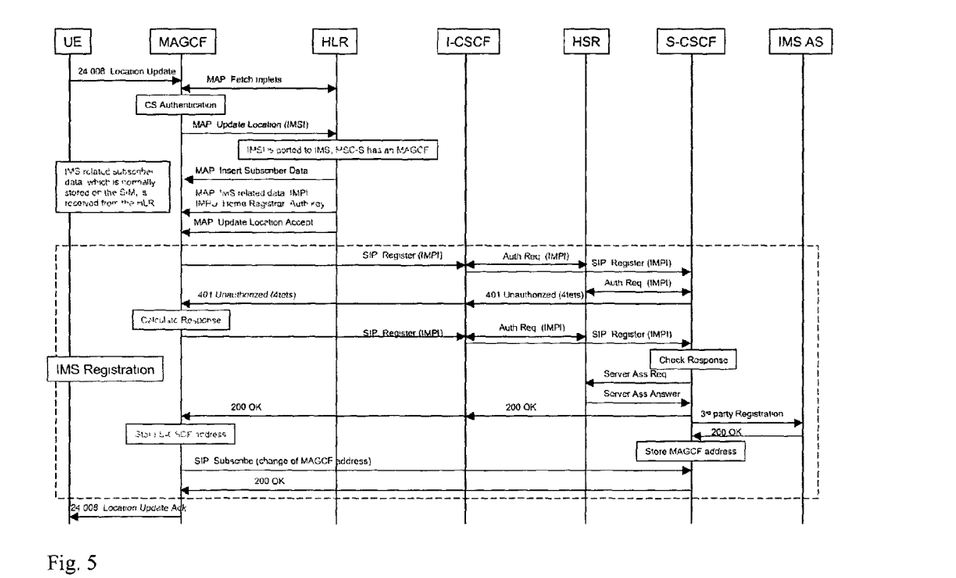
FIG. 5 shows an embodiment of a signalling sequence for performing IMSI Attach in MAGCF and IMS registration.

Currently in order to access circuit-switched service a registration procedure of the user in the circuit-switched network is to be performed. Said registration procedure might be performed during location update procedure. Thus, in case a user changes the location a 24.008 IMSI attach message is sent to the responsible mobile switching center MSC, which derives the Home Location Register HLR address from the received IMSI. Thus, in the first step the UE sends the 24.008 message Location Update to the MAGCF, indicating the location update type, namely IMSI attach, to initiate the registration procedure in the cellular system. By means of a MAP protocol being the application protocol employed for the dialogues between the MSC and HLR, the HLR is contacted for authentification of the user. For this purpose the MAGCF sends MAP: Fetch triplets to the HLR in order to receive user's parameters required for performing authentication. In case the user is authorised, the procedure for updating the user's location by sending the message MAP: Update Location (IMSI) is sent. Subsequently, the HLR checks whether the sending node has MAGCF functionality. This can be checked either by receiving an indication in the MAP Update Location message, or by checking a list being accessible by the HLR where all MAGCF nodes are listed. Preferably this list is to be administered in the HLR. In the following step, the HLR checks the requesting subscriber, whether the subscriber is ported to IMS. If the user is not ported, standard behaviour for location update of a cellular user is applied by sending MAP: Insert Subscriber Data in order to insert the user to the MSC. However, if the user is ported to IMS, the HLR inserts the subscriber data into the MAGCF by sending MAP: Insert Subscriber Data. Additionally in the message, IMS related data, like information required for the registration in the IMS system might be sent. This might be for example IMPI (IP Multimedia Private Identity), IMPU IP Multimedia Public identity, Home Register, and/or Authentication key. The IMPI and the IMPU are the private and public identity of the subscriber, used together with the Authentication Key to register in the Home Registrar of the subscriber. In other words the HLR sends all the parameters to the MGCF, which are stored on the SIM in user's terminal. Finally, the message MAP:Update Location Accept is sent from the HLR to the MAGCF, finalizing the registration procedure in the cellular controlled network.

After the interaction the HLR is completed, the user agent located in the MAGCF registers the subscriber into IMS, indicating the reachability of the user via cellular-switched controlled access. Thus, during the IMS registration, the user agent handles on behalf of the subscriber.

As already mentioned the IMS uses SIP protocol for performing any kind of signalling, including the user's registration in the IMS system. A user equipment needs to perform IMS service registration before it can set up a session. Through a successful registration a suitable S-CSCF in the home network is assigned to the user in order to obtain the IMS service. According to the present invention the User Agent located in the MAGCF handles on behalf of the user. At first user's identity in the initial register request is sent to the I-CSCF, SIP:Register.

For the IMS the user agent located in the MAGCF is transparent, which means that the IMS does not notice that a user agent acts on behalf of the user and which means again, that the location of the user agent in the MAGCF does not have any impact on the registration or subscription procedure.

As aforementioned the I-CSCF is the contact point within an operator's network for all connections destined to a subscriber of that network operator, or a roaming user currently located within that network operator's service area. The main function performed by the I-CSCF is assigning a S-CSCF to a user performing SIP registration. The S-CSCF is the node that performs the session management for the IMS network.

Returning to FIG. 5 in order to find out whether an S-CSCF is already assigned to the user, the I-CSCF contacts the HSR, Auth.Req., being a data base administrating all IMS users. Subsequently the I-CSCF receives an answer with an address of a S-CSCF for contacting. The address might be either an S-CSCF already allocated to the user or if it is the first registration, for example after the user switched on the user equipment, the HSR returns a set of S-CSCF capabilities for selecting an S-CSCF. On the base of the capabilities and other available information an I-CSCF chooses an appropriate S-CSCF for the particular user. Then, the I-CSCF continues with the process by proxying the SIP:Register message to the chosen S-CSCF. The S-CSCF upon receipt of the message, starts the authentication of the user. For this purpose a dialogue with the HSR is performed for downloading authentication data. The HSR sends authentication data to the S-CSCF regarding the requesting user, so that the S-CSCF can properly authenticate the user. In order to verify the authentication performed internally, the S-SCCF sends a 401 Unauthorized message being forwarded via I-CSCF to the SIP receiver, wherein according to the present invention the SIP receiver is the user agent in the MGACF. Therefore for the IMS nodes, like I-CSCF, HSR, S-CSCF the user's functionality being shifted to the user agent according to the present invention, is transparent and said nodes do not notice any change in the handling of the registration.

When the user agent receives the SIP 401 Unauthorised response, it realises that there is a challenge included to deliver authentication parameter stored locally. Thus, upon receipt of this message the user agent derives the authentication data in an appropriate way by calculating a response and the user agent sends the second SIP: Register message to the S-CSCF. The same operation as for the first registration request is performed and it results that the S-CSCF performs a checking of the response with the already for the user stored authentication and if the verification is successful, then the S-CSCF sends a Server Ass.Req to the HSR for the purpose of informing the HSR that the user is now registered and in order to download the user profile. The S-CSCF replies with 200OK response and the MAGCF stores the S-CSCF address. Finally, following the IMS rules for registration, the S-CSCF stores the MAGCF address where the now registered subscriber can be reached. The storing of the MAGCF address is performed with receiving SIP: Subscribe (change of MAGCF address), which is also confirmed with the message 200OK. After finalising the registration procedure in the IMS, a 24:008 Location Update Ack is sent to the user indicating successful performed registration.

Additionally in this embodiment it is proposed that after successful registration, the user agent in the MAGCF subscribes in the S-CSCF to the registration status of the served subscriber. Thus, if the registration status of the subscriber changes in the S-CSCF, the MAGCF is to be informed thereabout. For example in case of roaming as it is described in the following embodiment, the MAGCF is to be informed that a user has left the responsibility area of said MAGCF.

The interaction with the IMS AS regarding third party registration is depicted in FIG. 5 for the sake of completeness without any impact on the invention.

In the following an embodiment describing roaming procedure in a home network is described in respect to FIG. 6.

Figure 6:
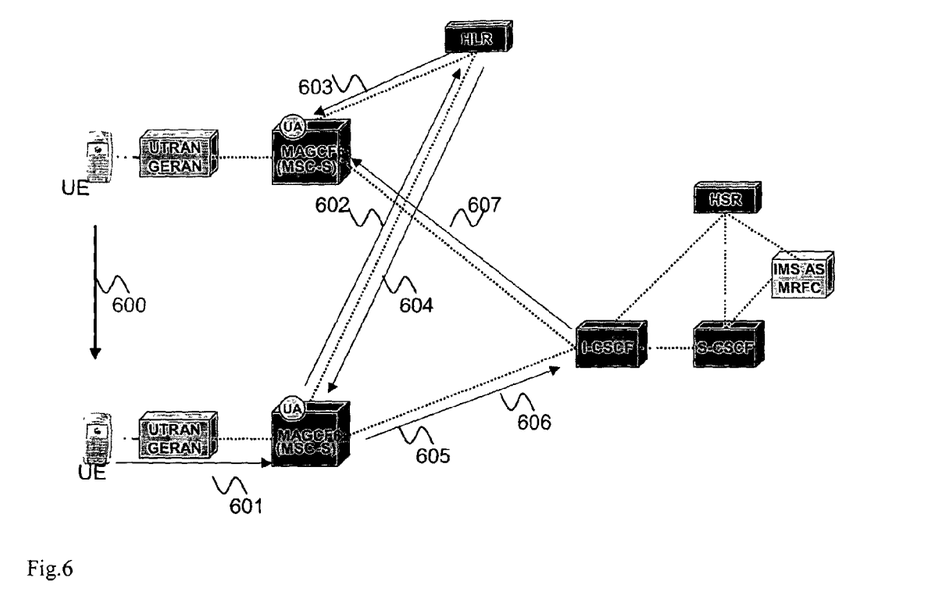
FIG. 6 shows a schematic embodiment for handling a user roaming between two MAGCFs.

The structure and nodes in FIG. 6 are similar to the structure according to FIG. 4. A home network is a network, with which a user has subscription for provision of services. Usually in a network a number of MSCs is provided, wherein a MSC is responsible for users being located in location areas being assigned to the MSC. Changing of the responsible MSC due to user's movement implies initiation of the roaming procedure aiming to register the user in a new MSC and de-register from the old MSC by performing all the necessary updates in respect therewith in the corresponding nodes.

Thus, FIG. 6 depicts a home network with two MAGCFs nodes, MAGCF61 and MAGCF62 and with a user roaming from MAGCF61 to MAGCF62, in step 600.

In this case the new MAGCF, MAGCF62 takes over the handling of the subscriber. However the change of MAGCF also affects the IMS registration, which is described in the following in respect to FIG. 6.

In step 601, after entering the new location area, the terminal sends a location update request to the new MAGCF, MAGCF62. When receiving this message, the MAGCF62 identifies the subscriber to be new in its responsibility. Subsequently the MAGCF62 informs the HLR about the availability of the user by sending for example MAP:Update Location, step 602. Similar as before mentioned, either the MAGCF indicates in the MAP message that it supports the MAGCF functionality, or the HLR determines the supported functionality of the MSC by checking a list in the HLR. Upon receiving the location update message, 602, the HLR informs the old MAGCF, MAGCF61 that the subscriber has roamed into a new MAGCF area. The HLR sends preferably a MAP Cancel Location message, 603, to the old MAGCF, MAGCF61. The receipt of this message means for a MAGCF that it does no longer server the subscriber. However, the old MAGCF cannot remove the subscriber record yet, as it is still responsible for the IMS registration. In step 604 the HLR inserts the subscriber data into the new MAGCF using a similar approach as it is described in respect to FIG. 4. Also the registration, step 605 and subscription 606 to the IMS system are performed in the similar way. That means, that the new MAGCF registers the subscriber into IMS, which results in changing the address of the serving MAGCF in the S-CSCF changes, 605. After successful registration, the user agent in the new MAGCF subscribes in the S-CSCF to the registration status of the served subscriber, 606, so that if the registration status of the subscriber is changed in the S-CSCF, the MAGCF will be informed. As a consequence of this approach, in step 607, the old MAGCF, MAGCF61 is informed by the S-CSCF that a new MAGCF is registered in the IMS. Upon receipt of the MAP Cancel Location 603 and the Notification of IMS subscription change message 607, the MAGCF61 removes the subscriber record. The result is that the cellular switched subscriber is now registered in IMS via the new MAGCF.

Optionally it is proposed to avoid sending the Notification of IMS subscription change message 607. The receipt of the message might be only issued if a MAGCF subscribes for receiving these kind of notifications.

Figure 7:
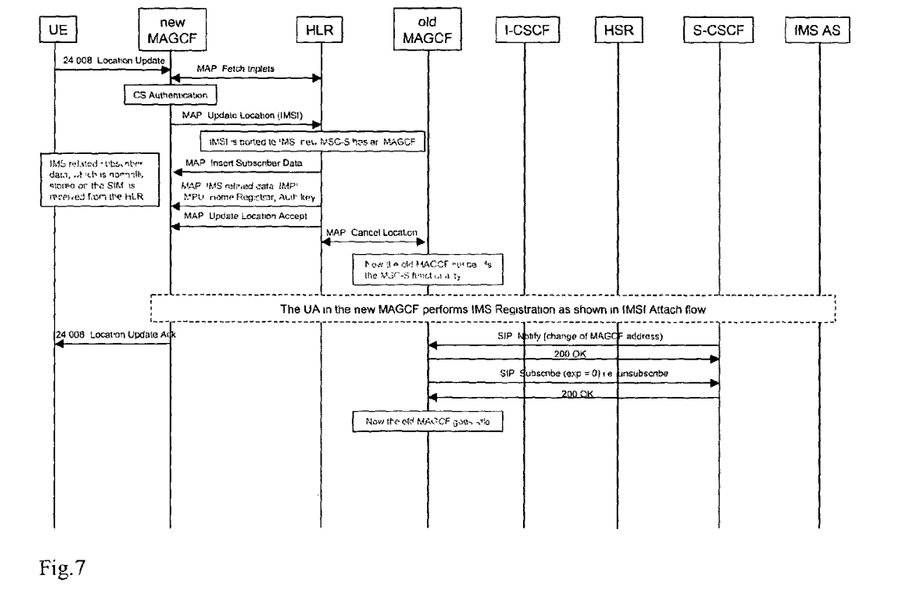
FIG. 7 shows an embodiment of a signalling sequence for performing a handling of a user roaming between two MAGCFs.

In the following an embodiment describing roaming procedure in a home network is described in respect to FIG. 7 presenting an exchange of signalling messages.

The nodes are similar as it is depicted and described according to FIG. 5. Additionally a new and an old MAGCF are depicted. All the messages are the same as in FIG. 5. The difference is that the HLR sends a MAP: Cancel Location message to the old MAGCF after performed registration procedure of a user in the cellular system. The receipt of this message causes that the old MAGCF suspends the MSC-S functionality. Also the registration procedure in the IMS is similar as in case of IMS registration as described in respect to FIG. 5. The difference is that the S-CSCF notifies the old MAGCF that the MAGCF address has changed by means of the SIP: Notify message, which is confirmed with 200 OK message. Finally a SIP:Subscribe (exp=0) is sent which means that the old MAGCF unsubscribes itself from receiving any further notification about changes in user's registration in IMS. After sending this message the old MAGCF goes to idle status regarding the unregistered subscriber.

While roaming, the subscriber may leave the area of the home network and enter a visited network, in which a user does not have any subscription for providing any services. Depending on the capabilities of the visited network, it may also support the MAGCF functionality in its MSC-S. In this case roaming is handled in the same way as the above described roaming in the home network. The mechanism is the same, regardless whether it is the home or the visited network.

Figure 8:
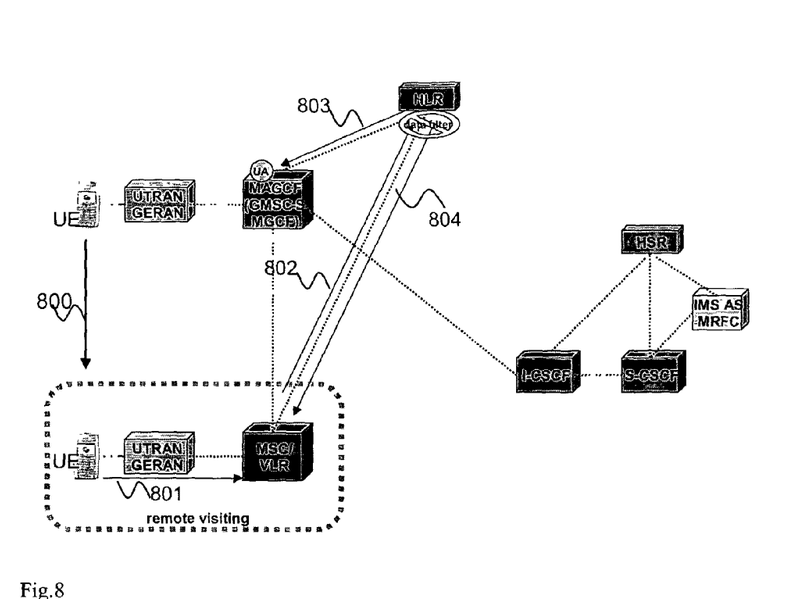
FIG. 8 shows a schematic embodiment for handling a user roaming between a MAGCF and a MSC.

However, it may happen that the visited network does not support MAGCF functionality. In this case, special care is needed in order to serve the subscriber, as the visited network cannot take care of the IMS registration. According to the present invention it is proposed to keep the previously used MAGCF as a roaming anchor point. In the following this kind of network is called remote visited network In the following an embodiment of the present invention is described in respect to FIG. 8 showing the case of roaming from MAGCF to a MSC. The nodes are similar to the nodes and connections therebetween as depicted in FIG. 6. The difference is that the new location area, to which a user moves into, is served by a MSC without the MAGCF functionality. Thus, when entering the new location area, 800, the user terminal sends a location update request to the new MSC/VLR, 801. When receiving the message, the MSC/VLR identifies the subscriber to be new in the serving area of said node. In the following step, 802 the MSC/VLR informs the HLR about the new subscriber. Hereby, there are again two possibilities of informing HLR whether the MSC supports the MAGCF functionality, namely either by sending such kind of information included in a message or by checking HLR's internal list of MAGCF nodes. In the presented embodiment, the result of the checking procedure is that the contacting MSC does not have the MAGCF functionality.

Therefore in step 803, the HLR informs the MAGCF that the subscriber has roamed into a new MSC/VLR area. Preferably, the HLR sends a MAP Cancel Location message to the MAGCF. The receipt of this message means for the MAGCF that it is not responsible for serving the user in the cellular switched controlled network anymore. However, the MAGCF cannot remove the subscriber record yet, as it is still responsible for the IMS registration. Therefore it is proposed that the MAGCF stays as a roaming anchor point as long as the subscriber is roaming in the remote visited network. The HLR inserts the subscriber data into the MSC/VLR as it is well-known, 804. These data do not contain any new data being IMS specific enhancements as it is the case in the previously presented embodiments.

Further it is proposed to provide a data filter in the HLR for filtering subscriber data being sent to the MSC/VLR in order to prevent execution of IMS services in the MSC/VLR. This when sending the message 804, for example in form of the MAP operation Insert Subscriber data, the HLR filters out all supplementary service subscriptions before sending the data to the MSC/VLR, like Barring of all outgoing international calls (BOIC), which is a supplementary service, which prevents to conduct international calls, when this service is active.

Figure 9:
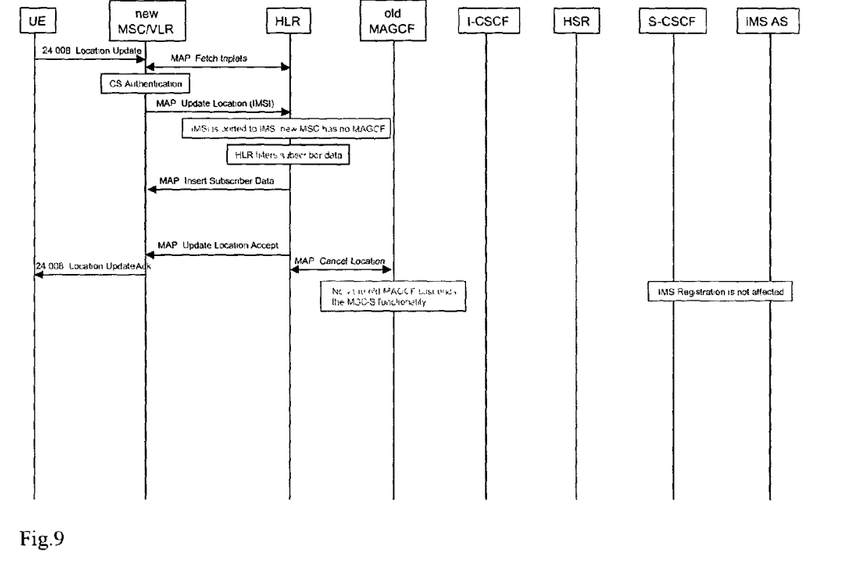
FIG. 9 shows an embodiment of a signalling sequence for performing a handling of a user roaming between a MAGCF and a MSC.

In the following signalling exchange sequence is presented in respect to FIG. 9 depicting the embodiment of a user's roaming from an old MAGCF to a new MSC/VLR.

The structure of FIG. 9 is similar to the structure of the aforementioned embodiments describing signalling sequences. The Location Update in the HLR via MSC/VLR is the same as previously described. By checking the capabilities of the MSC from which the MAP: Update Location (IMSI) is received, the HLR notices that the MSC does not support the MAGCF functionality and therefore the HLR filters subscriber data by sending "not subscribed" for the supplementary services. As a consequence, MAP:Insert Subscriber Data message is sent to the MSC/VLR for informing the MSC of non-availability of all circuit-switched services for the user.

It is to be noted that the IMS registration in the S-CSCF is not affected by roaming into a remote visited network. Moreover the old MAGCF after receiving the MAP: Cancel Location only suspends the MSC functionality for the user, since this functionality is to be performed by the new MSC/VLR. However, the old MAGCF is still the anchor point for the circuit-switched access towards IMS and interworks circuit-switched protocols towards IMS protocols. The telephony service as such and the telephony supplementary services are still provided by IMS and especially all incoming and outgoing calls are routed via the old MAGCF.

In the following a further embodiment is presented. When roaming in the remote visited network, the subscriber may enter the service area of another MSC/VLR. The change from the old MSC/VLR towards the new MSC/VLR while roaming is performed in the following described way according to FIG. 10.

Figure 10:
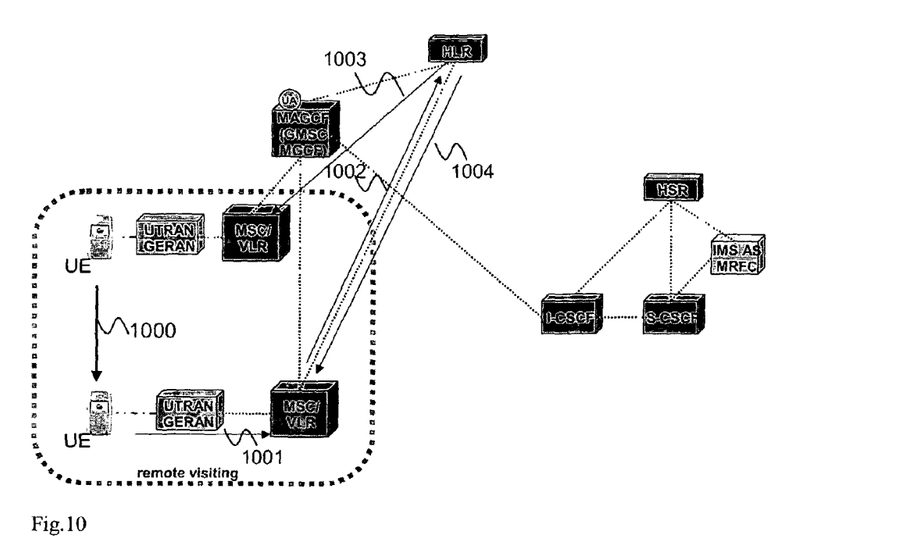
FIG. 10 shows a schematic embodiment for handling a user roaming between two MSCs, wherein the user is already registered in a IMS system.

As already mentioned, when entering a new location area, 1000, the terminal sends a location update request to the new MSC/VLR. When receiving the message, the MSC/VLR identifies the subscriber to be new in its serving area, 1001. In step 1002 the MSC/VLR informs the HLR about the new subscriber.

The HLR either receives or delivers from the internal data that the MSC/VLR sending the message does not have MAGCF functionality. In the subsequent step, the HLR informs the old MSC/VLR that the subscriber has roamed into a new MSC/VLR area. The HLR sends the message 1003 to the old MSC/VLR. The receipt of this message means for the old MSC/VLR that it does no longer server the subscriber. The HLR inserts the subscriber data into the new MSC/VLR, 1004. These data do not contain any new, IMS specific enhancements due to the fact that the MSC/VLR does not support any MAGCF functionality. However, an indication is sent to cause the MSC/VLR to route all originating call to the MAGCF. Also as in the foregoing embodiment explained, the subscriber data sent to the MSC/VLR are filtered, in order to prevent execution of services in the MSC/VLR. Also as in the above described embodiment the IMS registration in the S-CSCF is not affected by this roaming into a remote visited network. The difference to the previous embodiment is that the changing of the MSC/VLR does not affect the MAGCF; the location update is performed transparent without involving the MAGCF.

The signaling sequence according to this embodiment is similar to the signaling sequence as described in respect to FIG. 9, with the only difference that no MAP:Cancel Location message is sent to the MAGCF but instead of this, said message is sent to the old MSC/VLR. Therefore no figure presenting the signaling sequence is introduced.

Figure 11:
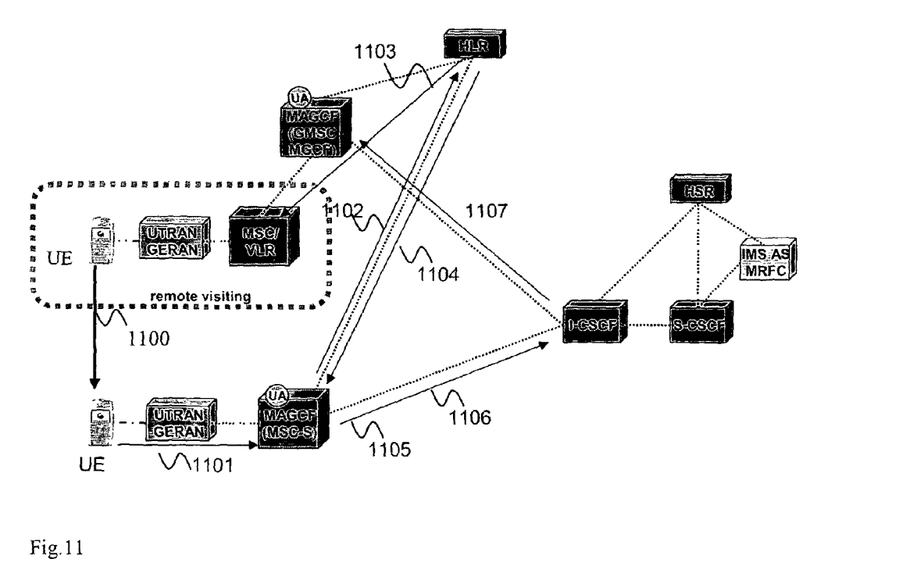
FIG. 11 shows a schematic embodiment for handling a user roaming between a MSC and a MAGCF.

In the following embodiment, in respect to FIG. 11, the scenario is presented, when roaming in the remote visited network, 1100, the subscriber may reenter the home network or another visited network that supports MAGCF functionality. When entering the area of an MAGCF, this may be the current roaming anchor, or any other MAGCF.

The first steps, 1101, 1102 remain the same as in the previous embodiments. Thus, when entering the new location area, the terminal sends a location update request to the new MAGCF, 1101, and the MAGCF informs the HLR about its new subscriber, 1102. The HLR informs the old MSC/VLR that the subscriber has roamed into a new MAGCF area, 1103. Preferably by sending a MAP Cancel Location message to the old MSC/VLR. Receipt of this message indicates to the MSC/VLR that it does no longer server the subscriber. Since the HLR has the information that the new MSC support the MAGCF functionality, the HLR inserts data into the answer required for the registration in the IMS system, 1104. The new MAGCF registers the subscriber into IMS by changing the address of the serving MAGCF in the S-CSCF changes, 1105. After successful registration, 1106, the user agent in the new MAGCF subscribes in the S-CSCF to the registration status of the served subscriber. So if the registration status of the subscriber is changed in the S-CSCF, the MAGCF will be informed. Since the old MAGCF was also registered to be notified in case of changes in the IMS subscription, the old MAGCF is therefore to be informed by the S-CSCF that a new MAGCF is registered. The old MAGCF can be unsubscribed from these notifications, 1107. After receiving the message 1107, notifying of IMS subscription change, the old MAGCF removes the subscriber record. As a result of this procedure, the subscriber is now registered in the cellular system and in IMS by means of the new MAGCF.

Figure 12:
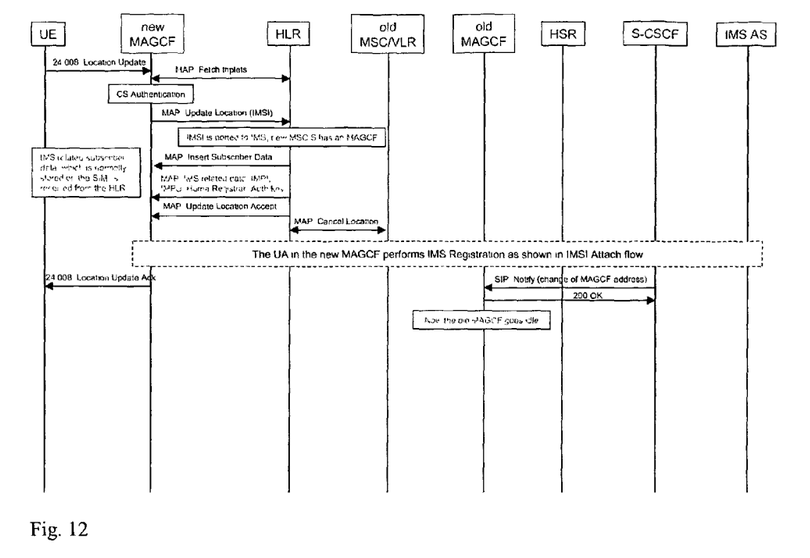
FIG. 12 shows an embodiment of a signalling sequence for performing a handling of a user roaming between a MSC and MAGCF.

The signalling sequence describing this embodiment in respect to FIG. 12 is similar to the sequence for example in FIG. 7, the difference is that there is a new, an old MAGCF and an old MSC/VLR. Thus before performing the registration in IMS MAP:Cancel Location to the old MSC/VLR is sent to de-register the user from the access in cellular system via the old MSC/VLR. Afterwards the registration procedure in IMS is performed, as described for example in respect to FIG. 5. Finally the old MSGCF is informed by means of SIP:Notify(change of MAGCF address) about changes in user's status in IMS. Said message is acknowledged with 200OK to the S-CSCF and the consequence is that the old MAGCF is not anymore responsible for the user in the IMS system.

In the above described embodiments the roaming has been discussed in details. However, on top of the procedures done when the subscriber actually roams, some procedures are triggered also for stationary subscribers. Those events are for example the Re-Registration, De-Registration, 24.008 Location Update, 24.008 Periodic Location Update or 24.008 IMSI Detach procedures, which are in the following mentioned.

The MAGCF has to initiate a SIP re-registration procedure towards the S-CSCF at expiry of the registration timer of the user agent. The registration is similar to the registration as aforementioned with the difference that the IMS sets the time intervals for a new re-registaration. In case the re-registration is not performed the user's registration is deleted. Preferably the MAGCF should check whether the UE has performed successful periodic location update recently.

The MAGCF has to initiate a SIP de-registration procedure at reception of a 24.008 IMSI Detach from the UE. The procedure is equal to the registration, but expires value is set to 0.

When receiving a 24.008 Location Update from the user equipment with a new Location Area Identifier LAI, this has to be stored in the VLR for the case of paging. This procedure is similar to the case of roaming within the service area of the MAGCF.

Finally it is to be mentioned that the MAGCF has to initiate a SIP de-registration when a 24.008 IMSI detach message is received informing that the user's terminal is switched off. The procedure is equal to the registration, but expires value is set to 0.

The above-described embodiments are based on integration of cellular-switched controlled users equipment, like it is provided in GSM or GPRS, into IMS services developed in connection with UMTS. However, the present invention is not only restricted to these networks. A further example might be CDMA2000 providing corresponding nodes as the nodes existing in GPRS or UMTS.

The invention claimed is:

1. An Access Gateway Node (MAGCF) for providing access to an IP multimedia system for a circuit-switched controlled user's terminal located in a circuit-switched controlled domain, wherein said node comprises:
   a circuit-switched function configured to provide exchange signaling for a circuit-switched controlled user's terminal, wherein said circuit-switched function is configured to interact with a home register located in a home circuit-switched controlled domain to obtain from the home register, a user's IP multimedia system parameter, the user's IP multimedia system parameter being an indication that a subscription of the circuit-switched controlled user's terminal has been ported to the IP multimedia system;
   a user agent configured to utilize the user's IP multimedia system parameter to register the circuit-switched controlled user's terminal to the IP multimedia system on behalf of the circuit-switched controlled user's terminal, wherein the user agent registers the circuit-switched controlled user's terminal to the IP multimedia system without further signaling with the circuit-switched controlled user's terminal; and
   an exchange interface configured to exchange signaling between the user agent and the circuit-switched function.

2. The Access Gateway Node according to claim 1, wherein the user's IP multimedia system parameter is a list of parameters required to register the circuit-switched controlled user's terminal in the IP multimedia system.

3. The Access Gateway Node according to claim 1, wherein the exchange interface is configured to forward the user's IP multimedia system parameter from the circuit-switched function to the user agent.

4. The Access Gateway Node according to claim 1, wherein the exchange interface is configured to deliver an indication to the user agent to register the circuit-switched controlled user's terminal in the IP multimedia system or to update the registration of the circuit-switched controlled user's terminal.

5. The Access Gateway Node according to claim 1, wherein the exchange interface is configured to translate between circuit-switched controlled signaling and IMS controlled signaling.

6. The Access Gateway Node according to claim 1, wherein the circuit-switched function is configured to receive from a mobile switching node to which the circuit-switched controlled user's terminal is attached, a mobility related notification to provision an access to the IP multimedia system.

7. A register node located in a home circuit-switched controlled domain for communicating with a circuit-switched function, the register node comprising:
- a receiver entity configured to receive from the circuit-switched function, a request message to handle a circuit-switched controlled user's terminal;
- a provision module configured to provide information about a functionality of the circuit-switched function sending the request message, wherein the functionality indicates whether the circuit-switched function is part of an Access Gateway Node for providing an access to the IP multimedia system;
- a user's parameter module configured to provide a user's IP multimedia system parameter applicable in the IP multimedia system when the circuit-switched function is part of the Access Gateway Node; and
- a sender entity configured to send a message to the circuit-switched function with the user's IP multimedia system parameter, the user's IP multimedia system parameter being an indication that a subscription of the circuit-switched controlled user's terminal has been ported to the IP multimedia system;
- wherein a user agent in the Access Gateway Node utilizes the user's IP multimedia system parameter to register the circuit-switched controlled user's terminal in the IP multimedia system on behalf of the circuit-switched controlled user's terminal, wherein the user agent registers the circuit-switched controlled user's terminal in the IP multimedia system without further signaling with the circuit-switched controlled user's terminal.

8. The Register node according to claim 7, further comprising a list with circuit-switched functions with the information about the supported functionality, wherein the provision module has access to said list.

9. The Register node according to claim 7, wherein the information about the functionality is included in a notification message provided from the circuit switched function, and the provision module is configured to extract said information.

10. The Register node according to claim 7, wherein said register further comprises a tracking module configured to keep track of the serving Access Gateway Node and of a mobile switching node to which the circuit-switched controlled user's terminal is attached.

11. The Register node according to claim 7, wherein said register further comprises a selection unit configured to select a new serving Access Gateway Node when the circuit-switched controlled user's terminal leaves a serving area of a present Access Gateway Node.

12. The Register node according to claim 7, wherein the user's parameter module further comprises a modification module configured to modify the user's IP multimedia system parameter before sending it, when the circuit-switched controlled user's terminal is served by a mobile switching node.

13. The Register node according to claim 12, wherein the modification module is configured to remove services from the user's IP multimedia system parameter which are handled in the IP multimedia system.

14. The Register node according to claim 7, wherein the user's IP multimedia system parameter is provided to the user's parameter module either after migration of a user to the IP multimedia system performed by an operator or after an explicit registration of a user to the IP multimedia system.

15. A method of providing access to an IP multimedia system for a circuit-switched controlled user's terminal located in a circuit-switched controlled domain, the method comprising the following steps:
- a circuit-switched function being part of a Access Gateway Node receiving from a circuit-switched controlled user's terminal, a registration message;
- the circuit-switched function interacting with a home register node located in a home circuit-switched controlled domain to obtain from the home register node, a user's IP multimedia system parameter, the user's IP multimedia system parameter being an indication that a subscription of the circuit-switched controlled user's terminal has been ported to the IP multimedia system;
- the circuit-switched function providing the received user's IP multimedia system parameter to an user agent being part of the Access Gateway Node; and
- the user agent utilizing the user's IP multimedia system parameter to register the circuit-switched controlled user's terminal in the IP multimedia system on behalf of the circuit-switched controlled user's terminal, wherein the user agent registers the circuit-switched controlled user's terminal in the IP multimedia system without further signaling with the circuit-switched controlled user's terminal.

16. A method of providing access to an IP multimedia system for a circuit-switched controlled user's terminal located in a circuit-switched controlled domain with the following steps to be performed in a home register located in a home circuit-switched controlled domain and configured to communicate with a circuit-switched function:
- receiving a request message regarding a circuit-switched controlled user's terminal from the circuit-switched function for handling the circuit-switched controlled user's terminal;
- providing information about a functionality of the circuit-switched function sending the request message, wherein the functionality indicates whether the circuit-switched function is part of an Access Gateway Node providing access to the IP multimedia system;
- providing a user's IP multimedia system parameter applicable in the IP multimedia system when the circuit-switched function is part of the Access Gateway Node; and
- sending a message to the circuit-switched function with the user's IP multimedia system parameter, the user's IP multimedia system parameter being an indication that a subscription of the circuit-switched controlled user's terminal has been ported to the IP multimedia system;
- wherein a user agent in the Access Gateway Node utilizes the user's IP multimedia system parameter to register the circuit-switched controlled user's terminal in the IP multimedia system on behalf of the circuit-switched controlled user's terminal, wherein the user agent registers the circuit-switched controlled user's terminal in the IP multimedia system without further signaling with the circuit-switched controlled user's terminal.

* * * * *

UNITED STATES PATENT AND TRADEMARK OFFICE
CERTIFICATE OF CORRECTION

PATENT NO. : 9,614,876 B2  
APPLICATION NO. : 12/090993  
DATED : April 4, 2017  
INVENTOR(S) : Witzel et al.

Page 1 of 2

It is certified that error appears in the above-identified patent and that said Letters Patent is hereby corrected as shown below:

On the Title Page

Item (57), under "ABSTRACT", in Column 2, Line 2, delete "terminal" and insert -- terminals --, therefor.

In the Specification

In Column 1, Lines 12-13, delete "UMTS (Universal Telecommunication Network)" and insert -- UMTS (Universal Mobile Telecommunication Service) --, therefor.

In Column 4, Line 40, delete "than it" and insert -- then it --, therefor.

In Column 5, Line 28, delete "invention, and" and insert -- invention, --, therefor.

In Column 6, Line 7, delete "Switched Radio)" and insert -- Radio Service) --, therefor.

In Column 6, Lines 7-8, delete "Telephone System)" and insert -- Telecommunication Service) --, therefor.

In Column 6, Line 17, delete "cellular-switched controlled network, 12," and insert -- circuit-switched domain, 12, --, therefor.

In Column 6, Line 18, delete "MAGCF" and insert -- MAGCF, --, therefor.

In Column 6, Line 23, delete "Mode," and insert -- Node, --, therefor.

In Column 6, Line 24, delete "network 11" and insert -- IMS 11 --, therefor.

In Column 6, Line 25, delete "network 12," and insert -- circuit-switched domain 12, --, therefor.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,614,876 B2

In Column 6, Line 33, delete "cellular-switched controlled network, 12" and insert -- circuit-switched domain, 12 --, therefor.

In Column 6, Line 38, delete "Protocol MAP" and insert -- Part, MAP, --, therefor.

In Column 7, Line 57, delete "agent 103." and insert -- agent 102. --, therefor.

In Column 7, Line 59, delete "IF" and insert -- IP --, therefor.

In Column 11, Line 20, delete "S-SCCF" and insert -- S-CSCF --, therefor.

In Column 11, Line 23, delete "MGACF." and insert -- MAGCF. --, therefor.

In Column 13, Line 55, delete "well-known, 804." and insert -- well-known, --, therefor.

In Column 13, Line 64, delete "of all" and insert -- of --, therefor.

In Column 15, Line 41, delete "in IMS" and insert -- in IMS, --, therefor.

In Column 15, Line 45, delete "MSGCF" and insert -- MAGCF --, therefor.

In the Claims

In Column 17, Line 36, in Claim 8, delete "Register" and insert -- register --, therefor.

In Column 17, Line 40, in Claim 9, delete "Register" and insert -- register --, therefor.

In Column 17, Line 45, in Claim 10, delete "Register" and insert -- register --, therefor.

In Column 17, Line 50, in Claim 11, delete "Register" and insert -- register --, therefor.

In Column 17, Line 55, in Claim 12, delete "Register" and insert -- register --, therefor.

In Column 17, Line 61, in Claim 13, delete "Register" and insert -- register --, therefor.

In Column 18, Line 1, in Claim 14, delete "Register" and insert -- register --, therefor.